July 28, 1936.     M. WEISZ     2,049,034
TRANSLUCENT SUNDIAL
Filed Nov. 1, 1935
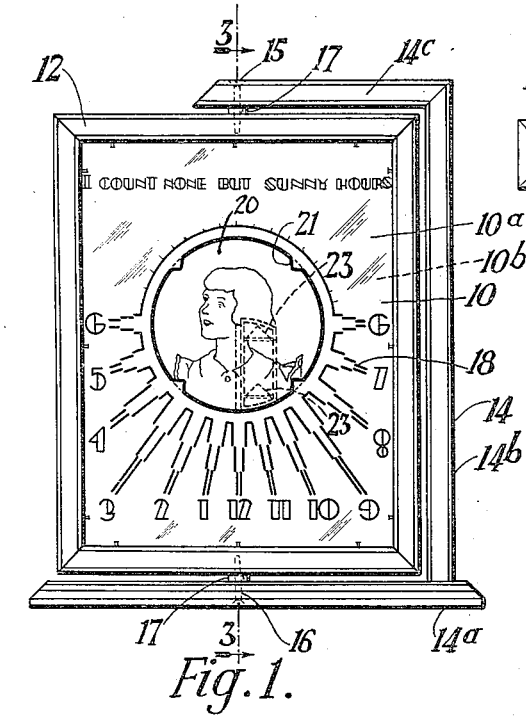
Fig. 1.
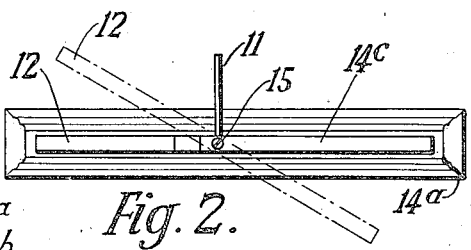
Fig. 2.
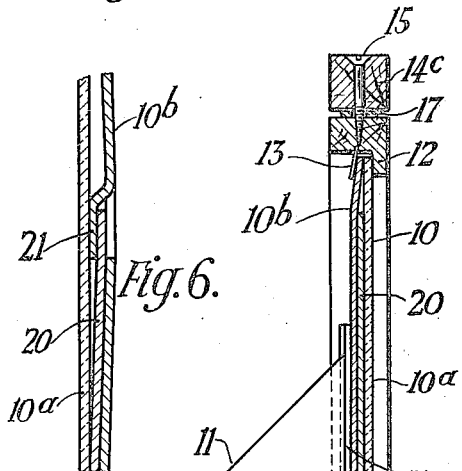
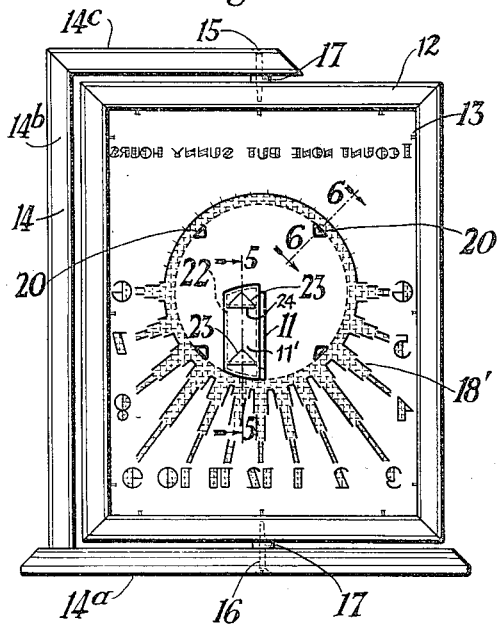
Fig. 4.
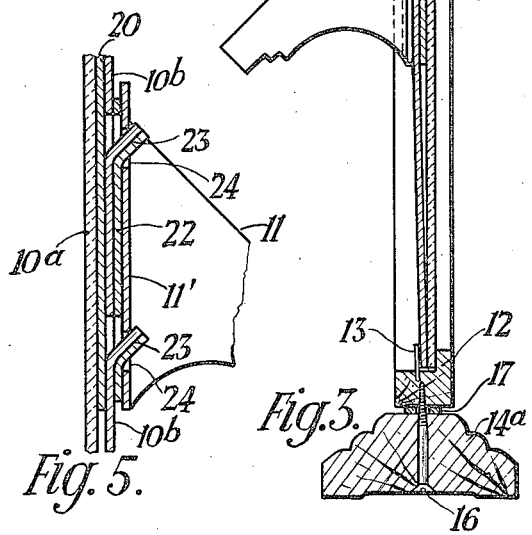
INVENTOR
Martin Weisz
BY
ATTORNEY Patented July 28, 1936

2,049,034

UNITED STATES PATENT OFFICE 2,049,034

TRANSLUCENT SUNDIAL

Martin Weisz, New York, N. Y.

Application November 1, 1935, Serial No. 47,763

10 Claims. (Cl. 33—62)

This invention relates to new and useful improvements in sun dials and has particular reference to a translucent sun dial.

It is an object of this invention to construct a sun dial plate which is adapted to be placed with its back to the sun, and to mount a gnomon on the back thereof which is adapted to cast a shadow of the sun's rays upon the back of the dial plate so that the shadow may be seen from the front and the time read.

A further object of the invention is to adjustably mount the translucent dial plate upon a vertical axis so that the sun dial may be set on windows facing in different directions, and properly adjusted relative to the sun for the correct operation thereof. When thus constructed, the sun dial is adapted to be used indoors in sun parlors, sun rooms, or in any other sun swept window, and may be adjusted to face a predetermined direction, as south for the proper operation thereof.

A still further object of the invention is the arrangement of a sun dial in which the numbering of the hour lines reads in a clockwise direction, contrasted with the reading of corresponding lines in a conventional sun dial in counter-clockwise rotation.

Still further, the invention contemplates the association of a photograph with the dial plate for ornamental purposes, and for utilitarian reasons such as shading off the mounting of the gnomon.

Still further the invention proposes to construct the translucent dial plate from parchment of a particular substance found by experiment to be advantageous.

It is further proposed to paint or imprint certain colors upon the back side of the parchment which will be viewable from the front thereof when the sun dial is in the rays of the sun.

The invention also contemplates a novel construction for detachably mounting the gnomon in position on the parchment.

As another object of this invention a novel arrangement is proposed for mounting the photograph upon the parchment.

Another object of the invention is the construction of a device as described which is simple and durable and which may be manufactured and sold at a reasonable cost.

For further comprehension of the invention, and of the objects and advantages thereof, reference will be had to the following description and accompanying drawing, and the appended claims in which the various novel features of the invention are more particularly set forth.

In the accompanying drawing forming a material part of this disclosure:—

Fig. 1 is a front elevational view of a sun dial constructed according to this invention.

Fig. 2 is a plan view of Fig. 1.

Fig. 3 is an enlarged sectional view taken on the line 3—3 of Fig. 1.

Fig. 4 is a rear elevational view of Fig. 1.

Fig. 5 is a fragmentary enlarged sectional view taken on the line 5—5 of Fig. 4.

Fig. 6 is a fragmentary enlarged sectional view taken on the line 6—6 of Fig. 4.

The translucent sun dial, according to this invention, comprises a translucent dial plate 10 adapted to be placed with its back to the sun, and a gnomon 11 mounted upon the back of the dial plate and adapted to cast a shadow of the sun's rays upon the back of the dial plate so that the shadow may be seen from the front and the time of day read.

More particularly, the translucent plate 10 consists of a pane of glass 10a behind which a sheet of porcelain-finished Japanese parchment 10b is mounted. The pane 10a and the parchment 10b are mounted within a conventional picture frame 12. Nails 13, driven into the sides of the picture frame, serve to hold the parchment and pane in position. The picture frame 12 is adjustable about a vertical axis on a support 14. This support comprises a base portion 14a from which a vertical arm 14b extends. The vertical arm is connected at the top with a short horizontal arm 14c. A pivot 15 is engaged through the arm 14c and engages into the top side of the frame 12. A bottom pivot 16 is engaged through the base 14a and engages into the bottom side of the frame 12.

Washers 17 are interposed between the frame 12 and the support to provide a clearance for the proper pivoting of the frame. The pivots 15 and 16 are vertical and aligned with each other so that the support may be rested upon a window sill or other object, and the frame turned to be directed towards the south, or other predetermined direction. In Fig. 2 the dot and dash lines, indicated by the reference numeral 12, show a turned position of the frame relative to the support.

The front side of the parchment 10b is imprinted with radial numbered hour lines 18. It should be noted that these numbered hour lines read clockwise, which is very desirable in that the public has become accustomed to reading a clock in that fashion. This is in distinct contrast with conventional sundials in which the numbered hour lines read anti-clockwise. It is possible, and necessary, to have the numbered hour lines 18 read clockwise because the gnomon 11 is attached on the rear of the translucent dial plate and the device is positioned to have the sun strike the rear.

To add to the effect of the sun dial the rear face of the parchment 10b is painted with translucent yellow paint emphasizing the hour lines 18. This may be clearly seen in Fig. 4 wherein the paint is indicated by reference numeral 18'. The arrangement is such that when the sun shines through the translucent plate the illuminated yellow will have the appearance of golden rays.

At the optical center, which is slightly above the geometrical center, there is a photograph 20 mounted upon the front face of the parchment 10b. Preferably, this photograph should be of a child's face or other portrait. It is held removably in position by several inward directed prongs 21 cut from the parchment 10b. As shown on the drawing, there are four of these prongs. They extend over the edge of the photograph, which is circular, and so hold the photograph in position.

The gnomon 11 is attached in a very novel fashion. There is a reinforcement strip 22 attached upon the rear face of the parchment 10b in the vicinity of the gnomon. This reinforcement strip and the parchment are cut out to form upwardly directed prongs 23. The photograph 20 serves to hide the cut out areas produced by the formation of the prongs 23, and also serves to cast a concealing shadow over the base of the gnomon. The gnomon 11 has a base flange 11' which is formed with a pair of slits 24 through which the prongs 23 extend. The gnomon may be removed by forcing it upwards so as to lift it free from the prongs 23. These prongs 23 are of triangular shape, as shown in Fig. 4. The reinforcement strip 22 is of a size so as to be hid from view and is located beneath the base 11' of the gnomon. For outdoor use porcelain or milked glass (opal glass) should be used as the material of the translucent plate.

The operation of the device consists merely in standing the support 14 on a window sill or upon an object in a sun room, sun parlor, or any sun swept place, and then adjusting the frame 12 to face due south. The device is placed with the parchment and picture facing inwards relative to the room. The sun striking the outer side of the sun dial will illuminate the back of the parchment, except where the shadow is cast by the gnomon 11. This gnomon is so designed that the shadow will fall upon the hour lines upon the parchment and indicate the correct time of day. A proverb such as "I Count None But Sunny Hours" is inscribed upon the parchment 10b above the photograph, and the rear of the parchment is treated with translucent yellow paint to give the proverb a glowing effect when the device is in the sun.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A translucent sun dial, comprising a translucent dial plate adapted to be placed with its back to the sun, and a gnomon on the back of said dial plate adapted to cast a shadow from the sun's rays on the back of said dial plate so that the shadow may be seen from the front of the dial plate and the time of day read.

2. A translucent sun dial, comprising a translucent dial plate adapted to be placed with its back to the sun, and a gnomon on the back of said dial plate adapted to cast a shadow from the sun's rays on the back of said dial plate so that the shadow may be seen from the front of the dial plate and the time of day read, said dial plate being mounted within a frame which is supported on a stand so as to be adjustable about a vertical axis.

3. A translucent sun dial, comprising a translucent dial plate adapted to be placed with its back to the sun, and a gnomon on the back of said dial plate adapted to cast a shadow from the sun's rays on the back of said dial plate so that the shadow may be seen from the front of the dial plate and the time of day read, said dial plate being imprinted with numbered radial hour lines arranged with the numbers thereon indicating the hours and reading clockwise.

4. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, and a concealing element mounted on said sun dial at the center of the radiation of said hour lines for covering said gnomon and concealing a portion of its shadow from view through said dial plate.

5. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, said dial plate comprising a pane of glass and a sheet of porcelain-finished Japanese parchment.

6. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, said dial plate comprising a pane of glass and a sheet of porcelain-finished Japanese parchment, and a concealing element covering said gnomon and concealing a portion of its shadow from view through said dial plate mounted upon the front face of said parchment at the optical center of the dial plate, and held in position by several prongs cut from the parchment and engaging over the edges of the element.

7. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, said dial plate comprising a pane of glass and a sheet of porcelain-finished Japanese parchment, said dial plate being imprinted with radially numbered hour lines thereon to give the hours of the day.

8. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, said dial plate comprising a pane of glass and a sheet of porcelain-finished Japanese parchment, a reinforcement strip of material being secured on said parchment beneath said gnomon, said reinforcement and parchment being formed with cut out upward extending prongs on which the gnomon is mounted.

9. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, said dial plate comprising a pane of glass and a sheet of porcelain-finished Japanese parchment, a reinforcement strip of material being secured on said parchment beneath said gnomon, said reinforcement and parchment being formed with cut out upward extending prongs on which the gnomon is mounted said gnomon having slots to engage said prongs.

10. A translucent sun dial, comprising a translucent dial plate adapted to be placed with its back to the sun, a gnomon on the back of said dial plate adapted to cast a shadow from the sun's rays on the back of said dial plate so that the shadow may be seen from the front of the dial plate and the time of day read, said dial plate comprising a pane of glass and a sheet of porcelain-finished Japanese parchment, a reinforcement strip of material being secured on said parchment beneath said gnomon, said reinforcement and parchment being formed with cut out upward extending prongs on which the gnomon is mounted, said gnomon having slots to engage said prongs, and an element mounted upon said parchment for concealing the shadow of the mounting of the gnomon.

MARTIN WEISZ.